Figure 1:
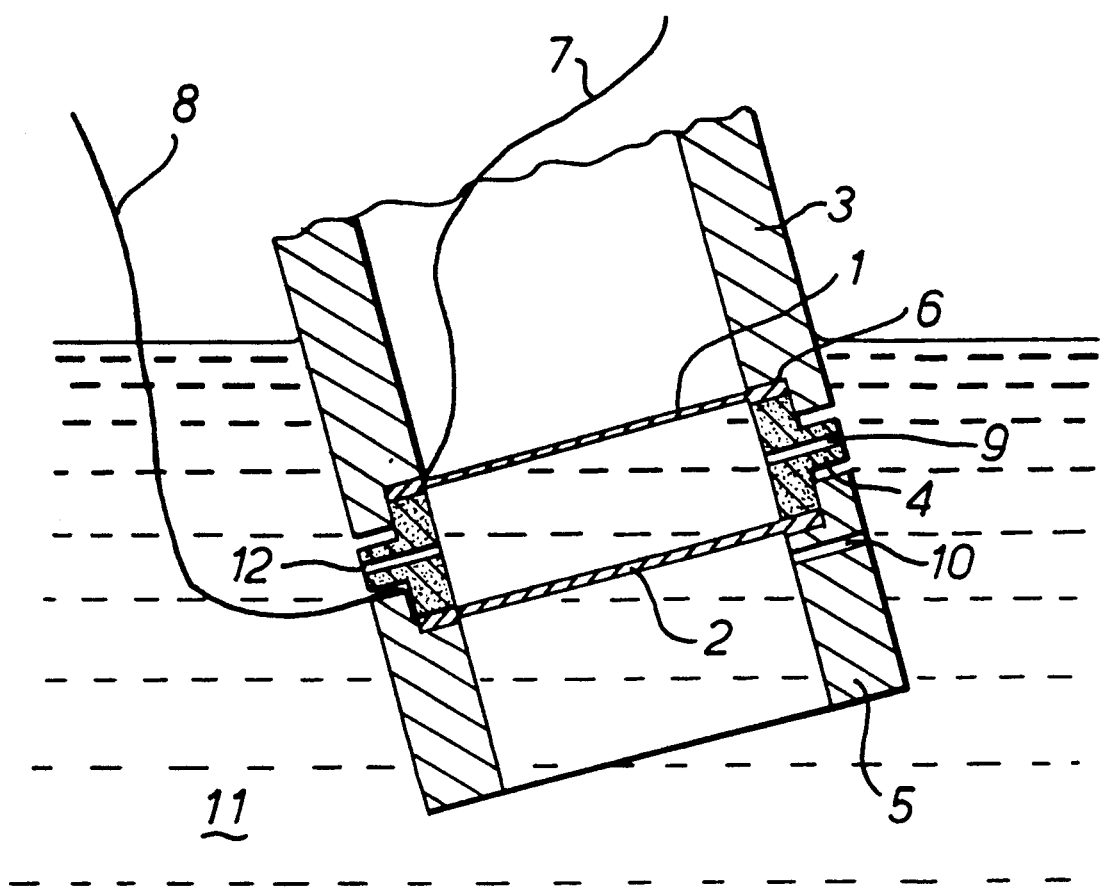

United States Patent [19]

Larminie

[11] Patent Number: 5,004,424
[45] Date of Patent: Apr. 2, 1991

[54] APPARATUS FOR DEMONSTRATING AND STUDYING THE OPERATION OF A FUEL CELL

[75] Inventor: James Larminie, Oxford, United Kingdom

[73] Assignee: Johnson Matthey Public Limited Company, England

[21] Appl. No.: 566,892

[22] Filed: Aug. 13, 1990

Related U.S. Application Data

[63] Continuation of Ser. No. 259,732, Oct. 19, 1988, abandoned.

[30] Foreign Application Priority Data

Oct. 20, 1987 [GB] United Kingdom ............... 8724543

[51] Int. Cl.$^5$ .......................................... G09B 23/18
[52] U.S. Cl. ............................ 434/301; 429/12; 434/379
[58] Field of Search ............... 434/301, 365, 379, 224, 434/126, 283, 298; 429/27, 28, 29, 13, 15

[56] References Cited

U.S. PATENT DOCUMENTS

| | | | |
|---|---|---|---|
| 2,572,918 | 10/1951 | Fisher et al. | 429/27 |
| 2,907,809 | 10/1959 | Southworth et al. | 429/27 |
| 3,188,241 | 6/1965 | Weiss et al. | 429/15 |
| 3,446,675 | 5/1969 | Jost | 429/17 |
| 3,511,710 | 5/1970 | Jung et al. | 429/15 |
| 3,522,096 | 7/1970 | Grubb | 429/27 |
| 4,001,040 | 1/1977 | Fukuda et al. | 429/15 |
| 4,126,733 | 11/1978 | Doniat | 429/27 |
| 4,150,197 | 4/1979 | Zaromb | 429/15 |
| 4,184,009 | 1/1980 | Armstrong | 429/29 |
| 4,242,421 | 12/1980 | Kudo et al. | 429/13 |
| 4,406,758 | 9/1983 | McIntyre et al. | 429/15 |
| 4,478,917 | 10/1984 | Fujita et al. | 429/42 |
| 4,503,132 | 2/1985 | Struthers | 428/672 |
| 4,528,249 | 7/1985 | Galbraith | 429/27 |
| 4,711,828 | 12/1987 | Ishida et al. | 429/12 |

Primary Examiner—William H. Grieb
Attorney, Agent, or Firm—Cushman, Darby & Cushman

[57] ABSTRACT

The apparatus comprises five main components: two catalysed electrodes (1 and 2), and three plastics parts, a top tube (3), a spacer (4) and a bottom tube (5). The apparatus may be partially immersed in a liquid mixture (11) of fuel and electrolyte, e.g. methanol and potassium hydroxide, so that the liquid mixture (11) is able to freely circulate in contact with the underside of the upper electrode (1) and both sides of the lower electrode (2) while the top side of the upper electrode (1) is exposed to the air. The apparatus thus operates as a fuel cell in which the methanol is oxidized by oxygen from the air to produce carbon dioxide, water and electrical energy. The apparatus can be used in the teaching of a wide range of scientific principles. It can also form the basis of a small commercial fuel cell capable of powering a light, radio, television etc.

15 Claims, 3 Drawing Sheets

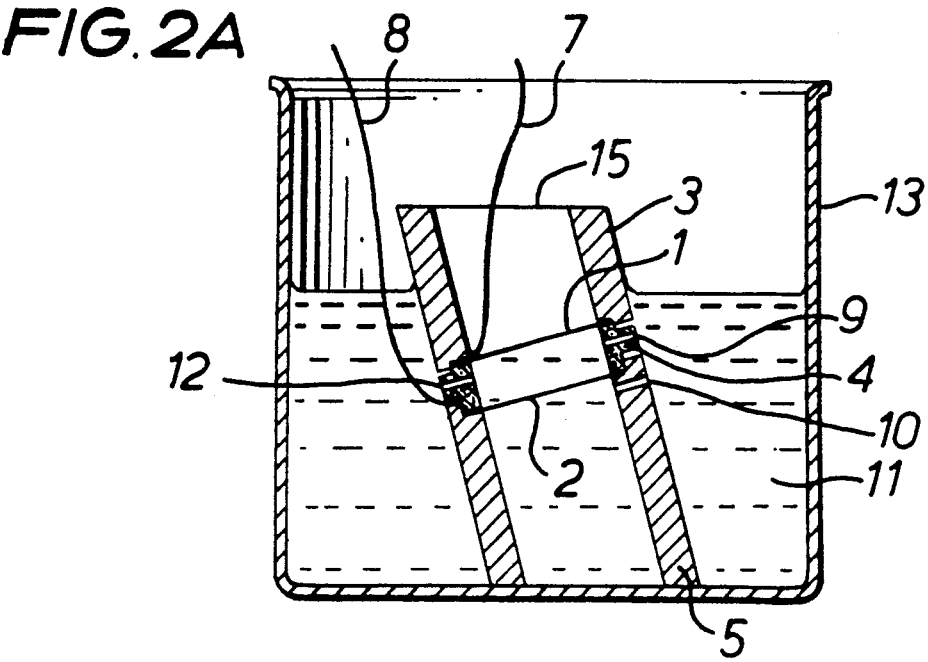
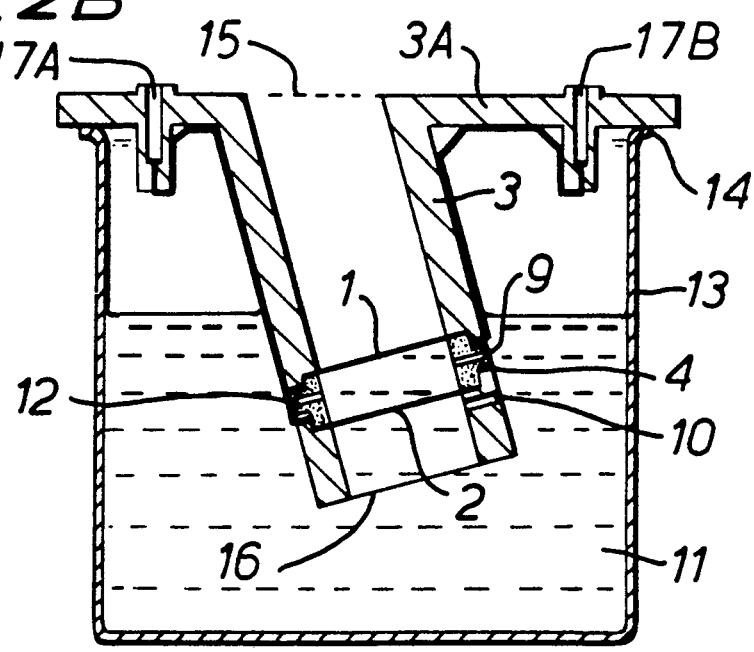

APPARATUS FOR DEMONSTRATING AND STUDYING THE OPERATION OF A FUEL CELL

This is a continuation of application Ser. No. 07/259,732, filed on Oct. 19, 1988, which was abandoned upon the filing hereof.

This invention relates to apparatus for demonstrating and studying the operation of a fuel cell, and, in particular, apparatus for use in schools and other teaching establishments to help in the teaching of a variety of scientific principles. The invention also relates to a fuel cell.

Although fuel cells have been used in a variety of applications, the applicants have perceived the need to provide apparatus for demonstrating and studying the operation of a fuel cell for use in teaching establishments.

Thus, according to a first aspect of the invention there is provided apparatus for demonstrating and studying the operation of a fuel cell comprising: a first catalysed electrode which is permeable to oxygen but impermeable to liquid; a second catalysed electrode; means for providing an electrical connection to each of the electrodes; and a housing arranged to hold the first and second electrodes in spaced relationship to each other, the housing being arranged such that, when partially immersed in a liquid mixture of fuel and electrolyte, the liquid mixture is able to circulate freely in contact with one side of the first electrode and both sides of the second electrode and the other side of the first electrode is exposed to the air.

As will be described in more detail below, it has also been perceived that such apparatus can also be used to help teach a wide variety of scientific principles.

Such apparatus may also form the basis of a simple, reliable fuel cell. Thus, according to a further aspect of the invention, there is provided a fuel cell comprising: a container for holding a liquid mixture of fuel and electrolyte; a first catalysed electrode which is permeable to oxygen but impermeable to liquid; a second catalysed electrode; means for providing an electrical connection to each of the electrodes; and a housing holding the first and second electrodes in spaced relationship to each other, the arrangement being such that, when the housing is partially immersed in the liquid mixture held within the container, the liquid mixture is able to circulate freely in contact with one side of the first electrode and both sides of the second electrode and the other side of the first electrode is exposed to the air.

Preferred features of the invention will be apparent from the following description and the subsidiary claims of the specification.

Figure 3:
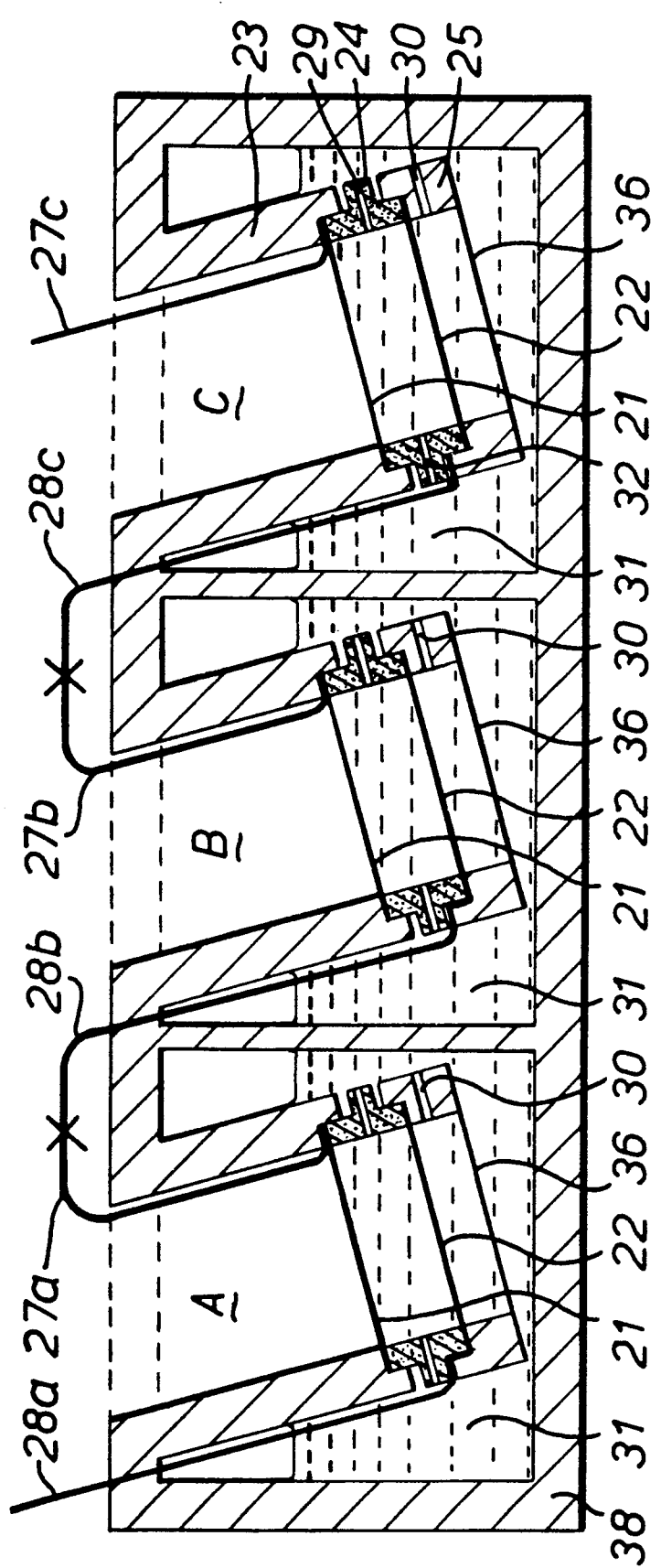

The invention will now be described, merely by way of example, with reference to the accompanying drawings, in which:

FIG. 1 shows the principle components of a preferred form of apparatus according to the first aspect of the invention;

FIGS. 2A and B show two embodiments of the invention incorporating the components shown in FIG. 1; and FIG. 3 shows a preferred form of a fuel cell according to the second aspect of the invention.

The fuel cell to be described can be made very small so that it can conveniently be used in, say, a 500 ml beaker as commonly available in school laboratories. This fuel cell uses methanol (or ethanol) as the fuel, and uses oxygen from the air as the oxidant. The basic reaction is the same as for burning methanol but the energy produced is electrical instead of heat:

$$METHANOL + AIR \rightarrow CARBON\ DIOXIDE + WATER + ENERGY$$

The apparatus shown in FIG. 1 consists of five main parts, two electrodes 1 and 2, and three plastic parts, a top tube 3, a spacer 4, and a bottom tube 5. (In FIGS. 1 and 2 the thickness of the spacer 4, and hence the separation of the electrodes 1 and 2, has been exaggerated to make the arrangement clearer.) Electrical connections 7 and 8 are provided to the upper and lower electrodes 1 and 2, respectively.

Air holes 9 and 10 are provided in the spacer 4 and bottom tube 5 to help in allowing air to escape from the space between the electrodes 1 and 2 and from beneath the bottom electrode 2 when the apparatus is placed into a liquid mixture 11 of fuel and electrolyte, in this instance methanol and potassium hydroxide. A further hole 12 is provided in the spacer 4 to allow the liquid mixture 11 to enter the space between the electrodes 1 and 2 as air is leaving through the hole 9.

The apparatus is immersed in a liquid mixture 11 as shown in FIG. 1 with the electrodes and holes inclined at an angle of between 10° to 60° to the horizontal. The inclination of the electrodes 1 and 2 and of the holes 9, 10 and 11 in the spacer 4 and bottom tube 5 allows the liquid to fill the space between the electrodes 1 and 2 and the space beneath the lower electrode 2 as the apparatus is placed into the liquid 11.

The apparatus may be shaped so as to be able to stand on the bottom of a beaker 13 as shown in FIG. 2A or may be shaped so as to support itself from the lip 14 of a beaker 13 as shown in FIG. 2B by means of a flange 3A provided at the upper end of the top tube 3.

In the arrangement shown in FIG. 2A, the liquid mixture 11 is able to circulate freely in contact with the underside of the upper electrode 1 and the top side of the lower electrode 2 by means of holes 9 and 12 in the spacer 4. The liquid mixture 11 is also able to circulate freely in contact with the underside of the lower electrode 2 by means of a hole or cut-out (not shown) in the side walls of the lower tube 5 as well as by the hole 10. Air is able to contact the top side of the upper electrode 1 by means of the open end 15 of the top tube 3.

In the arrangement shown in FIG. 2B, the liquid mixture 11 is able to circulate freely in contact with the underside of the upper electrode 1 and top side of the lower electrode 2 by means of holes 9 and 12 in the spacer 4. The liquid mixture 11 is also able to circulate freely in contact with the underside of the lower electrode 2 by means of the open end 16 of the bottom tube 5 as well as by the hole 10. Air is able to contact the top side of the upper electrode 1 by means of the open end 15 of the top tube 3.

The electrodes 1 and 2 are made of a conductor, e.g. a nickel mesh, which does not react with the liquid 11, and are coated with a catalyst, e.g. platinum black, that promotes the reactions described below. The upper electrode 1 is permeable to oxygen but impermeable to liquid. Each side of the electrodes may have a surface area in the range 5–80 cm$^2$, e.g. 10 cm$^2$. Instead of providing the hole 12 in the spacer 4, access to the space between the electrodes 1 and 2 may be provided by one or more apertures (not shown) provided between the edge of the lower electrode 2 and the bottom tube 5 or passing through the electrode 2 itself.

The top tube 3, spacer 4 and bottom tube 5 may be made of a plastics material strong enough to withstand everyday use within a school laboratory. Polypropylene is a suitable material. The parts may also be made of a substantially transparent plastics material to allow the electrodes to be seen when the apparatus is assembled.

The electrical connections to the electrodes 1 and 2 may simply comprise terminals attached thereto to which wires can be attached as shown in FIG. 1. The wire may also lead to further terminals 17A and B mounted in the flange 3A of the upper tube as shown in FIG. 2B.

The liquid mixture may comprise alcohol, e.g. methanol or ethanol, as the fuel and an acid, alkali or salt solution as the electrolyte. Other compounds such as formic acid and formaldehyde can be used in place of the alcohol as the fuel. A typical liquid mixture 11 comprises 10 ml of methanol mixed with 240 ml 1N potassium hydroxide solution. With an electrode area of about 10 cm², a fuel cell can be constructed which provides a current of about 80 mA at about 0.4 volts (at room temperature). This is sufficient to measure with the type of ammeters commonly available in school laboratories and is enough to drive small electric motors, bulbs etc.

The operation of a fuel cell as illustrated in FIGS. 2A and B will now be described:

The catalyst on the lower electrode 2 promotes a reaction between the alcohol and the ions in the liquid 11, which releases electrons, which pass along the wire 8. The alcohol is thus reduced.

At the upper electrode 1 the catalyst promotes a reaction between oxygen from the air (on one side of the electrode) and the ions in the liquid 11 (on the other side of the electrode). This reaction absorbs electrons from the wire 7. The oxygen is thus reduced.

If the two wires are joined together through some electrical load (not shown), then electrons flow from electrode 2 to electrode 1, and both the reactions proceed continuously. An electric current thus flows through the load. The overall reaction is given by the following equation:

$$2CH_3OH + 3O_2 \rightarrow 4H_2O + 2CO_2 + energy$$

The reaction is believed to go through several steps and, while the reaction is not completely understood, it is thought that the methanol reacts in three stages, as described below.

Firstly the methanol is oxidised to formaldehyde, releasing two electrons and two hydrogen ions, as shown below.

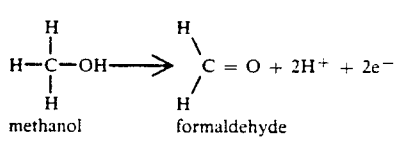

A hydroxyl ion from the electrolyte reacts with the formaldehyde, oxidising it further to form formic acid, and releasing one H⁺ ion and two more electrons.

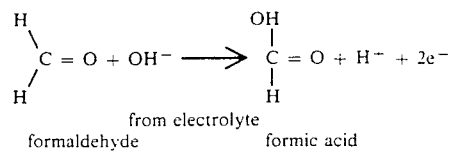

This formic acid is further oxidised, releasing two more electrons, 2 H⁺ ions and forming carbon dioxide.

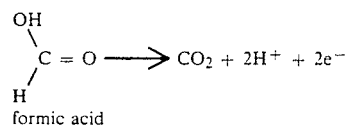

All this activity takes place on the catalyst covering the lower electrode 2. This lower electrode 2 is called the anode, because positive ions, the H⁺ ions, are formed there. Each fully oxidised methanol molecule requires one OH⁻ molecule, and release five H⁺ ions, six electrons and one $CO_2$ molecule. These are supplied by, or absorbed, at the upper electrode 1. The electrons travel round the circuit, the ions travel through the electrolyte.

To produce a balanced reaction, two methanol molecules must be considered, these release twelve electrons and ten H⁺ ions and need two OH⁻ ions. At the upper electrode 1, three $O_2$ molecules, six H⁺ ions and the twelve electrons react as shown below, producing six OH⁻ molecules.

$$3O_2 + 6H^+ + 12e^- \rightarrow 6OH^-$$

Two of these OH⁻ radicals are used at stage 2 above. (Remember we are considering two methanol molecules.) The other four react with the last four H⁺ ions, producing water:

$$4OH^- + 4H^+ \rightarrow 4H_2O$$

These reactions take place at the upper electrode 1, which is called the cathode, because the negative OH⁻ ions are formed there. The complete reaction is thus:

$$2CH_3OH + 3O_2 \rightarrow 4H_2O + 2CO_2$$

A careful study of the above explanation will reveal that the electrons flow round the circuit from the anode to the cathode. The anode is thus the "negative" terminal of the device, and the cathode is the "positive" terminal.

Besides helping to provide an understanding of the chemistry described above, the fuel cell can also be used to study a wide range of other scientific principles. Some of these will be discussed briefly below:

RATES OF REACTION

The effect of temperature, concentration and catalysts on rate of reaction is a very important concept in the physical sciences.

The apparatus described above is able to give a direct and quantitative indication of how fast a chemical reaction is going. This is achieved by connecting an ammeter to the cell. (The current is proportional to the rate of reaction, because two electrons pass round the circuit for every oxygen atom reacted.)

This direct quantitative reading of rate of reaction is an important feature of this experiment. Other reaction rate experiments tend to involve either qualitative indications, e.g. height of flame, rate of bubbling etc, or involve measuring gas evolved, pH changes etc. over a period of time. This latter type of experiment has three main disadvantages, (i) it takes a long time, (ii) it is more complicated to perform, and (iii) the conditions almost always change during the measurement period. With the methanol fuel cell however, the reaction rate, and the temperature of the fuel, can be easily measured and changed. Thus pupils can very easily produce graphs of reaction rate against temperature—accurately, and using very little mathematics.

MULTI-STEP REACTIONS

As discussed above, methanol does not react with oxygen to produce carbon dioxide immediately. The reaction goes through several steps. The advantage of the reaction in the fuel cell is that it can be started at each of the steps. This gives a convincing demonstration that the reaction really is going through these various steps. Also, the speed of the various steps can be roughly measured, to find which is the rate determining step.

As explained above, the reaction between methanol and air proceeds in three steps, as the methanol is progressively oxidised.

$$METHANOL \rightarrow FORMALDEHYDE \rightarrow FORMIC\ ACID \rightarrow CARBON\ DIOXIDE$$

This multi-step reaction can be investigated by starting at the different stages in the reaction. By fuelling the cell with methanol all three steps are gone through, but if formaldehyde is used as the fuel, it is only the last two steps. Finally, the reaction goes through only a single step if formic acid is used as the fuel.

The complete reaction is:

$$METHANOL + OXYGEN \rightarrow WATER + CARBON\ DIOXIDE$$

Each fully reacted molecule of methanol releases six electrons. The charge on one electron is $1.6 \times 10^{-19}$ Coulombs. So, the charge released per molecule is $9.6 \times 10^{-19}$ Coulombs. Remembering that 1 Amp = 1 Coulomb/sec, we can say that:

methanol molecules reacting per
sec. = current/$9.6 \times 10^{-19}$

In a similar way, the reaction $$FORMALDEHYDE + OXYGEN \rightarrow WATER + CARBON\ DIOXIDE$$

yields four electrons for each fully reacted formaldehyde molecule, i.e. $6.4 \times 10^{-19}$ Coulombs. So:

formaldehyde molecules
reacting/sec. = current/$6.4 \times 10^{-19}$

Also, for the final step $$FORMIC\ ACID + OXYGEN \rightarrow WATER + CARBON\ DIOXIDE$$

two electrons are released per formic acid molecule, so:

formic acid molecules
reacting/sec. = current/$3.2 \times 10^{-19}$

Experiments can thus be conducted to measure the current flowing in cells using the three different fuels: methanol, formaldehyde and formic acid.

The fuel cell works very well using formaldehyde and formic acid, so the experiment provides a very good illustration of multi-step reactions.

The experiment also allows the rate determining step to be found. It is found that the formic acid and formaldehyde reactions are a good deal faster than the whole reaction, so it can be deduced that the slowest and thus rate determining step must be the methanol to formaldehyde stage.

EXPERIMENTS WITH SMALL MOTORS

A cell driving a small motor clearly demonstrates that it is producing useful power. Many different small d.c. motors can be used and most of the small motors found in toys, cassette tape recorders etc can be driven by the fuel cell. The best results are obtained using precision servo motors. Experiments can be conducted leaving a cell driving such a motor for several days. Typically, this type of fuel cell can drive a servo motor for a week using about 5 ml of fuel.

It is also possible to construct a small vehicle with two motors, each driving one wheel. The vehicle can be made large enough to carry the fuel cell, and successfully driven along under its own power.

POWER

Power as rate of conversion of energy is an important concept in most physics and combined science syllabuses.

There are surprisingly few devices whose maximum power can be conveniently measured in the school science laboratory. The fuel cell is useful here, as it can be run at a stable power for a long time, and the power is small enough to be conveniently measured. This may be done by arranging the cell to drive a motor with the mechanical power produced by the motor measured by finding how long it takes to lift a load through a known height.

OXIDATION AND REDUCTION

In many syllabuses, the concept of oxidation as removal of electrons, and reduction as the addition of electrons is taught.

The miniature fuel cell can be a useful "bridge" between the elementary idea of oxidation as the adding of oxygen, e.g. $C + O_2 \rightarrow CO_2$, and the more complete idea, since a conventional oxidation type of reaction, and the movement of electrons, are clearly taking place at the same time.

ENERGY CONVERSION

The idea of changing energy from one form to another, (e.g. "electrical" to "light" in a lamp) is also an important part of basic physics and general science courses.

This fuel cell is an interesting addition to the range of energy conversion experiments currently available. The ordinary battery or cell converts chemical energy into electricity of course, but the connection between that chemical energy and the chemical energy in, say, coal, is very difficult to get across to even average pupils.

The fuel cell uses a demonstrably flammable fuel, and turns it into electricity in a much more obvious way.

POLLUTION AND ENVIRONMENTAL ISSUES

The topics of pollution, including NOX and acid rain, and the problems involved with fossil fuels, renewable resources etc figure prominently in modern chemistry and combined science syllabuses.

The fuel cell can be used to demonstrate a way of going from fuel to electricity without producing atmospheric pollutants. The fact that methanol and ethanol can be made from vegetable matter could be useful in furthering discussion on renewable resources for producing electricity, and provide an interesting way of demonstrating the solar→chemical→electrical energy chain.

The above topics are just some of those for which the fuel cell can be of assistance in teaching. It can, of course, also be used to teach about fuel cells themselves.

It will be appreciated that the apparatus described above and illustrated in FIGS. 1 and 2 is very simple and inexpensive to produce but can be of great use in demonstrating and studying the operation of a direct methanol fuel cell.

The apparatus can also provide the basis for a small commercial fuel cell suitable, for example, for powering lights, radios etc, especially in situations remote from a mains electricity supply, e.g. when camping or on board a small boat.

A preferred form of the apparatus according to the second aspect of the invention is shown in FIG. 3. The apparatus comprises a container 38 with three separate compartments A, B and C. In each compartment a single fuel cell is arranged in a manner similar to that illustrated in FIG. 2B. Each fuel cell has an upper electrode 21 and a lower electrode 22 and a top tube 23, a spacer 24 and a bottom tube 25. Holes 29 and 32 in the spacer 24 allow the liquid mixture 31 to circulate freely and contact the underside of the upper electrode 21 and the upperside of the lower electrode 22. The liquid mixture 31 is able to circulate freely in contact with the underside of the lower electrode 22 by means of the open end 36 of the bottom tube 25 and the hole 30. The three fuel cells are connected in series such that the upper electrode of compartment A is connected via wires 27a and 28b to the lower electrode 22 of compartment B. Similarly the upper electrode of the fuel cell in compartment B is connected to the upper electrode 21 of the fuel cell in compartment C by wire 27b and 28c. An electrical lead is connected between wires 28a and 27c, the apparatus may have a number of compartments from 3 to 40 each with a fuel cell. The liquid mixture 31 in a given compartment, for example compartment A, must be kept separate from the liquid mixture 31 in any other compartment.

A further form of the apparatus according to the second aspect of the invention is envisaged in which the apparatus may be shaped so as to support itself from the lips of a plurality of beakers.

I claim:

1. Apparatus for demonstrating and studying the operation of a fuel cell comprising;
   a first catalysed electrode which is permeable to oxygen but impermeable to liquid;
   a second catalysed electrode;
   means for providing an electrical connection to each of the electrodes; and
   a housing for holding the first and second electrodes in spaced relationship to each other, the housing being configured such that, when partially immersed in a liquid mixture of fuel and electrolyte, the liquid mixture can circulate freely in contact with one side of the first electrode and both sides of the second electrode, and the other side of the first electrode is exposed to ambient atmosphere.

2. Apparatus as claimed in claim 1 in which the housing is shaped so as to be able to stand on the bottom of a container containing the liquid mixture, at least one opening being provided in the housing below a given level for the liquid mixture to allow the liquid mixture access to the said one side of the first electrode and to both sides of the second electrode and a further opening being provided above the said level of the liquid mixture to expose the other side of the first electrode to ambient atmosphere.

3. Apparatus as claimed in claim 1 in which the housing is shaped as so as to support itself from the top of a container containing said liquid mixture, at least one opening being provided in the housing below a given level for said liquid mixture to allow said liquid mixture access to the said one side of the first electrode and to both sides of the second electrode and a further opening being provided above the said level of said liquid mixture to expose the other side of the first electrode to the air.

4. Apparatus as claimed in claim 3 in which the housing is shaped so that a plurality of first electrodes and second electrodes are held in spaced relationship to each other such that in use the fuel cells are connected in series.

5. Apparatus as claimed in claim 4 in which the housing is shaped so as to form a container with a plurality of compartments each compartment having a first and second electrode disposed therein.

6. Apparatus as claimed in claim 1 arranged such that the electrodes are held in planes inclined at an angle of between 10° and 60° to the horizontal.

7. Apparatus as claimed in claim 1 in which a first aperture is provided through a side wall of the housing to help assist air to escape from underneath the second electrode when said apparatus is placed into the liquid mixture.

8. Apparatus as claimed in claim 3 in which the walls of said housing are defined by a first tubular portion, a spacer and a second tubular portion configured to fit together so that the first electrode is held between the first tubular portion and the spacer and the second electrode is held between the spacer and the second tubular portion.

9. Apparatus as claimed in claim 8 in which the said at least one opening is provided in the wall of the second tubular portion and the said further opening comprises the open end of the first tubular portion.

10. Apparatus as claimed in claim 8 in which the said at least one opening comprises the open end of the second tubular portion and the said further opening comprises the open end of the first tubular portion.

11. Apparatus as claimed in claim 8 in which a second aperture is provided through a side wall of the spacer to allow the liquid mixture to pass there through to said space between the first and second electrodes.

12. Apparatus as claimed in claim 11 in which a third aperture is provided through a side wall of the spacer to help assist air to escape from the space between the first and second electrodes when the apparatus is placed into said liquid mixture.

13. Apparatus as claimed in claim 1 in which at least part of the housing is substantially transparent.

14. Apparatus as claimed in claim 1 when partially immersed in a liquid mixture said mixture comprising a fuel and electrolyte.

15. Apparatus as claimed in claim 14 in which the fuel comprises at least one member of the group consisting of methanol, formaldehyde and formic acid and the electrolyte comprises an alkali metal hydroxide.

* * * * *